United States Patent Office 2,763,530
Patented Sept. 18, 1956

2,763,530

PROCESS FOR DYEING LOOSE WOOL

Fritz Schuetz, Neuewelt, near Basel, Hans Roesti, Binningen, Otto Albrecht, Neuewelt, near Basel, and Jules Meyer, Basel, Switzerland, assignors to Ciba Limited, Basel, Switzerland, a Swiss firm No Drawing. Application December 18, 1951, Serial No. 262,343

Claims priority, application Switzerland January 11, 1951

4 Claims. (Cl. 8—43)

It is known that in dyeing loose wool tippy dyeings may be produced, that is to say, the tips of the wool hairs may be more strongly or more weakly dyed than the lower portions of the hairs. Moreover, in dyeing with mixtures of dyestuffs the separate dyestuff components are frequently fixed differently on the fiber, so that different shades are produced. These phenomena are in part due to the fact that the tips of the wool fibers are impaired by external influences, principally by the action of light, so as to have a capacity for fixing dyestuffs different from that of the lower portions of the fibers. This tippy dyeing is especially noticeable in the dyeing of loose wool.

The present invention is based on the observation that the tippy dyeing of loose wool with metallizable dyestuffs or dyestuffs containing metal in complex union can be successfully combatted by treating the loose wool before or during the dyeing operation with a small quantity of a reaction product of at least 4 molecular proportions of an $\alpha:\beta$-alkylene oxide with 1 molecular proportion of an organic compound containing at least one basic primary or secondary amino group, or one which contains a basic tertiary amino group and in addition an alcoholic hydroxyl group or of a salt or quaternary ammonium salt of such reaction product.

As starting materials for making the reaction products used in the invention there are used $\alpha:\beta$-alkylene oxides, such as ethylene oxide, propylene oxide or glycide. Especially valuable products are obtained by using ethylene oxide.

As organic compounds containing at least one basic primary or secondary amino group or a basic tertiary amino group and in addition an alcoholic hydroxyl group, there may be used amines of the aliphatic, aromatic or alicyclic series. Among those of the aliphatic series there may be mentioned monamines, for example, methylamine, ethylamine, diethylamine, butylamine, hexylamine, dodecylamine, cetylamine, oleylamine and octadecylamine, and also polyamines such as ethylene diamine or triethylene tetramine. There may also be used basic derivatives of such amines, such as esters of hydroxyamines with higher fatty acids, for example, the ester of triethanolamine with coconut oil fatty acid, or partial amides of polyamines with fatty acids, for example, triethylene tetramine monoacylated with coconut oil fatty acid. Among the amines of the aromatic series there come into consideration principally amines of the benzene and naphthalene series having an alkyl side chain containing, for example, 8 to 18 carbon atoms. Among those of the alicyclic series there are used preferably resin amines such as abietylamine, abietylmethylamine, the amine mixture corresponding to tall oil which contains resin amines in addition to higher alkyl amines, or hydrogenated abietylamine.

For the present invention there are suitable products which are obtainable by the reaction of 1 molecular proportion of an amine with at least 4, for example, 4-50, molecular proportions of an alkylene oxide, for example, the reaction product of 1 molecular proportion of dodecylamine with about 6 molecular proportions of ethylene oxide, or of 1 molecular proportion of oleylamine with 6, 8 or 16 molecular proportions of ethylene oxide, or of 1 molecular proportion of stearylamine with 8 or 16 molecular proportions of ethylene oxide. There are also suitable for the present invention condensation products of 1 molecular proportion of resin amines with 5 molecular proportions of ethylene oxide.

The condensation products are made by methods usual for the production of such products. Thus, for example, the components may be reacted together with heat. Advantageously, the alkylene oxide is added to the amine, not all at once, but gradually, for example, by adding it to or introducing it into the amino compound in the gaseous or liquid state at a temperature at which the alkylene oxide enters into reaction, for example, at 50–200° C. If desired the reaction may be carried out in a closed vessel under pressure, advantageously at 2 to 10 atmospheres gauge pressure. If necessary, a catalyst may be added to the reaction mixture. As catalyst there may be used with advantage substances having an alkaline reaction, such as metallic sodium, an alkali hydroxide, an alkali carbonate or an alkali salt of a carboxylic acid of low molecular weight.

The condensation products used in the present process are soluble or easily dispersible in water. The solubility in water may, if desired be increased by the introduction of groups enhancing solubility in water. Thus, for example, quaternary ammonium salts may be used which contain alkylene glycol chains derived from $\alpha:\beta$-alkylene oxides, and which can be made, for example, by the additive combination of an alkylating agent with the reaction product of a primary, secondary or tertiary amine of the aforementioned kind with the alkylene oxide. There may be mentioned the quaternary ammonium salt which is obtained by quaternating by means of dimethyl sulphate the reaction product of oleylamine with 6–10 molecular proportions of ethylene oxide.

Instead of reaction products of alkylene oxides on primary, secondary or tertiary amines of the aforementioned kind, there may be used products which are obtained by introducing into the amine polyglycol ether chains having a corresponding number of ether groups.

As dyestuffs which may be used in the process of the invention there come into consideration, in addition to metallizable dyestuffs, dyestuffs which already contain metal in complex union. Among the metals which the dyestuffs may contain or with which the dyestuffs may be metallized there may be mentioned cobalt and above all chromium.

As metallizable dyestuffs there may be used those which are applied in dyeing by the after-metallizing process in which the metal-free dyestuff is applied first and then the dyeing is subsequently treated with an agent yielding metal. Advantageously there are used dyestuffs capable of being after-chromed, and the known after-chroming process may be used.

When the process of the invention is carried out with the use of dyestuffs which already contain metal in complex union, preferably chromiferous dyestuffs, dyeing may be carried out by the methods usual for dyeing with this class of dyestuffs.

Among the dyestuffs capable of being after-chromed, which may be used in the present process, there may be mentioned, the dyestuff obtained by coupling diazotized 1-hydroxy-2-amino-4-chlorobenzene-6-sulphonic acid with 2:8-dihydroxynaphthalene-6-sulphonic acid, the dyestuff obtainable from diazotized 1-hydroxy-2-amino-4-nitrobenzene-6-sulphonic acid and 2:8-dihydroxynaphthalene-6-sulphonic acid, or the dyestuff which is obtained by coupling diazotized 1-hydroxy-2-amino-4-nitro-6-chlorobenzene with 2:8-dihydroxynaphthalene-6-sulphonic acid.

The treatment of loose wool in accordance with the invention with the condensation products described above may be carried out before or advantageously during the dyeing operation. Thus, it is of advantage to dissolve or disperse the condensation product in the dye liquor. In general only small quantities are necessary in order to prevent tippy dyeing. Usually quantities amounting, for example, to $\frac{1}{10}$ to $\frac{1}{3}$ of the weight of the dyestuff suffice.

The wool may also be treated before the dyeing operation. In this case the wool may be immersed at ordinary or a raised temperature in a solution or dispersion of one of the aforesaid condensation products. The subsequent dyeing is carried out in the usual manner.

Instead of adding the condensation product and the dyestuff separately, a dyestuff preparation may be made which contains the dyestuff and the condensation product. Such preparations can be made in a simple manner by mixing and/or grinding the components, if desired, with the addition of a diluent such as dextrin or urea.

The treatment of loose wool with the condensation products in accordance with the invention may, in addition to inhibiting tippy dyeing, also have the advantage that a dyeing of enhanced color strength is produced.

The following examples illustrate the invention, the parts being by weight:

Example 1

100 parts of loose wool are entered at 60° C. into a dyebath, which contains in 4000 parts of water 1 part of the dyestuff obtainable by coupling diazotized 1-hydroxy-2-amino-4-chlorobenzene-6-sulphonic acid with 2:8-dihydroxynaphthalene-6-sulphonic acid, 4 parts of acetic acid of 40 per cent. strength, 10 parts of crystalline sodium sulphate and 0.25 part of the condensation product described below. The temperature is raised to the boil in the course of 30 minutes and dyeing is carried on at the boil for 45 minutes. 5 parts of sulphuric acid of 10 per cent. strength are then added and dyeing is continued for a further 15 minutes. The dyebath is then cooled to about 70° C., 1 part of potassium bichromate is added, the whole is heated to the boil, and chroming is carried on at the boil for about 40 minutes. The wool is dyed a bluish grey tint, and the dyeing is very level.

The condensation product referred to above may be prepared as follows:

100 parts of commercial oleylamine are mixed with 1 part of finely divided sodium and heated to 140° C., and then ethylene oxide is introduced at 135–140° C. As soon as the ethylene oxide is taken up rapidly, the reaction temperature falls to 120–125° C., and the introduction of ethylene oxide is continued until 131 parts thereof have been taken up. The reaction product so obtained is soluble in water to give a practically clear solution.

Example 2

The procedure is the same as that described in Example 1, except that the dyestuff used is that obtainable by coupling diazotized 1-hydroxy-2-amino-4-nitrobenzene-6-sulphonic acid with 2:8-dihydroxynaphthalene-6-sulphonic acid.

Example 3

The procedure is the same as that described in Example 1, except that instead of the condensation product used therein, one of the condensation products described below or a mixture of 2 or more of these products is used.

(a) 20 parts of technical stearylamine are mixed with 0.2 part of finely divided sodium, and the whole is heated to 130° C., and then ethylene oxide is introduced at 120–130° C. until 44.8 parts have been taken up. The ethylene oxide derivative so obtained is soluble in water to give a practically clear solution.

(b) 20 parts of an ordinary commercial mixture of higher alkylamines and resin amines are mixed with 0.2 part of sodium and heated to 130° C., and then ethylene oxide is introduced in a finely distributed form at 120–130° C. until 44.8 parts have been taken up. The product so obtained is soluble in water to give a practically clear solution.

(c) 30 parts of the monoester of coconut oil fatty acid and triethanolamine are mixed with 0.15 part of sodium, and then ethylene oxide is introduced in finely distributed form at 120–125° C. until 77 parts have been taken up. The reaction product is soluble in water to give a clear solution.

(d) 21.4 parts of commercial oleylamine are mixed with 0.2 part of sodium, and then ethylene oxide is introduced at 120–125° C. in the form of a finely distributed gas stream until 48.5 parts have been taken up. The reaction product so obtained is soluble in water to give a practically clear solution.

(e) 73 parts of triethylene tetramine are heated to 145° C., and then 106 parts of coconut oil fatty acid are introduced while stirring in the course of 5 hours at 145–150° C. while passing nitrogen through the mixture. The whole is then stirred for a further 4 hours at 140–145° C.

25 parts of the amide so obtained are mixed with 0.12 part of sodium and heated to 165° C., and then ethylene oxide is introduced in the form of a finely distributed gas stream at 160–165° C. until 21.2 parts have been taken up. There is obtained a reaction product soluble in water to give a practically clear solution.

(f) 20 parts of commercial dodecylamine are heated to 125° C., and then ethylene oxide is introduced in finely distributed form at 120–125° C. until 22.4 parts have been taken up. The amine derivative so obtained is an oil which dissolves easily in water.

(g) 20 parts of commercial oleylamine are mixed with 0.1 part of sodium and heated to 125° C., and then ethylene oxide is introduced at 120–125° C. until 17.5 parts have been taken up.

(h) 80 parts of ethylene oxide are introduced at 158–163° C. in the course of about 2–3 hours into 144 parts of hydrogenated abietylamine (Rosin Amine D), in which 0.2 part of metallic sodium is suspended. At the end of the reaction some sodium is still present, and this is removed mechanically.

The reaction product is a light colored very viscous mass, which dissolves to give a clear solution in a large quantity of water with the addition of a small amount of acid.

Instead of the free condensation products described in paragraphs a–h, water soluble salts thereof can be used.

(i) 6–10 mols of ethylene oxide are caused to react with 1 mol of oleyl amine at 150–155° C. in the presence of a small quantity of metallic sodium. To prepare a quaternary salt, the reaction product is heated to 70–80° C. with dimethyl sulphate.

Example 4

100 parts of previously wetted loose wool are entered at 70° C. into a dyebath, which contains in 3000 parts of water 10 parts of crystalline sodium sulphate, 40 parts of sulphuric acid of 10 per cent strength, 0.8 part of the chromium complex of the dyestuff obtainable by coupling diazotized 1-hydroxy-2-amino - 4 - nitro - 6 - acetylaminobenzene with 2-hydroxynaphthalene-4-sulphonic acid, and 0.25 part of the condensation product described in Example 1. The temperature is raised to the boil in the course of 30 minutes and dyeing is carried on at the boil for 30 minutes. A further 40 parts of sulphuric acid of 10 per cent. strength are then added and dyeing is carried on at the boil for a further 1½ hours.

The wool is dyed a neutral grey tint and the dyeing is very level.

Instead of the dyestuff used above, there may be used the chromium complexes of the following dyestuffs: The chromium complex of the dyestuff which is obtainable by coupling diazotized 1-hydroxy-2-amino-4-nitro-6-acetylaminobenzene with 2:8 - dihydroxynaphthalene - 6-sulphonic acid (dyeing green), the chromium complex of the dyestuff which is obtainable by coupling diazotized 1-hydroxy-2-amino-4-nitro-6-acetylaminobenzene with 1-hydroxynaphthalene-5-sulphonic acid (dyeing reddish grey), or the brownish grey dyeing chromium complex of the dyestuff obtainable by coupling diazotized 1-hydroxy-2 - amino - 4 - nitro - 6 - acetylaminobenzene with 2 - hydroxynaphthalene-7-sulphonic acid. The chromium complexes of the above mentioned dyestuffs are obtained in the usual manner by heating the metal-free dyestuff for several hours with an agent yielding chromium, such as chromium sulphate, chromium formate or chromium fluoride.

What we claim is:

1. A process for combating the tippy dyeing of loose wool in the dyeing of such wool with wool dyestuffs selected from the class consisting of metallizable o,o'-dihydroxy monoazo dyestuffs and o,o'-dihydroxy monoazo dyestuffs containing metal in complex union, which comprises dyeing the loose wool with the said dyestuff and treating the tippy dyeing loose wool at the latest during the dyeing operation with a small quantity of a water-soluble condensation product which in its free base state corresponds to the formula

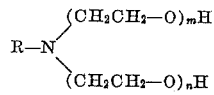

wherein R is a member selected from the group consisting of alkyl with at the most 18 carbon atoms and the hydrogenated abietyl group, $m$ and $n$ being whole numbers, and the sum $(m+n)$ having a value of at least 4.

2. A process for combating the tippy dyeing of loose wool in the dyeing of such wool with wool dyestuffs selected from the class consisting of metallizable o,o'-dihydroxy monoazo dyestuffs and o,o'-dihydroxy monoazo dyestuffs containing metal in complex union, which comprises dyeing the loose wool with the said dyestuff and treating the tippy dyeing loose wool at the latest during the dyeing operation with a small quantity of a water-soluble condensation product which in its free base state corresponds to the formula

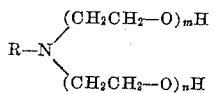

wherein R is the oleyl group, $m$ and $n$ are whole numbers, and the sum $(m+n)$ is 6.

3. A process for combating the tippy dyeing of loose wool in the dyeing of such wool with wool dyestuffs selected from the class consisting of metallizable o,o'-dihydroxy monoazo dyestuffs and o,o'-dihydroxy monoazo dyestuffs containing metal in complex union, which comprises dyeing the loose wool with the said dyestuff and treating the tippy dyeing loose wool at the latest during the dyeing operation with a small quantity of a water-soluble condensation product which in its free base state corresponds to the formula

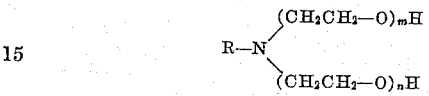

wherein R is the dodecyl group, $m$ and $n$ are whole numbers, and the sum $(m+n)$ is 6.

4. A process for combating the tippy dyeing of loose wool in the dyeing of such wool with wool dyestuffs selected from the class consisting of metallizable o,o'-dihydroxy monoazo dyestuffs and o,o'-dihydroxy monoazo dyestuffs containing metal in complex union, which comprises dyeing the loose wool with the said dyestuff and treating the tippy dyeing loose wool at the latest during the dyeing operation with a small quantity of a water-soluble condensation product which in its free base state corresponds to the formula

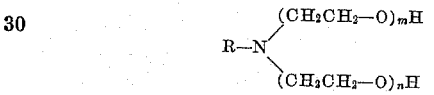

wherein R is the hydrogenated abietyl group, $m$ and $n$ are whole numbers, and the sum $(m+n)$ is 5.

References Cited in the file of this patent

UNITED STATES PATENTS

| | | |
|---|---|---|
| 2,040,796 | Rittinghausen | May 12, 1936 |
| 2,187,823 | Ulrich | Jan. 23, 1940 |
| 2,228,369 | Schoeller | Jan. 14, 1941 |
| 2,520,081 | Amick | Aug. 22, 1950 |

FOREIGN PATENTS

| | | |
|---|---|---|
| 909,592 | France | Mar. 24, 1944 |
| 380,851 | Great Britain | Sept. 12, 1932 |

OTHER REFERENCES

Amer. Dye Reporter for May 2, 1949, pages P378–392.